(12) United States Patent
Vetterli et al.

(10) Patent No.: US 10,327,581 B2
(45) Date of Patent: Jun. 25, 2019

(54) CLEANING AGENT CONTAINER

(71) Applicant: Franke Kaffeemaschinen AG, Aarburg (CH)

(72) Inventors: Heinz Vetterli, Wangen (CH); Mariano Turi, Zurich (CH)

(73) Assignee: Franke Kaffeemaschinen AG, Aarburg (CH)

( * ) Notice: Subject to any disclaimer, the term of this patent is extended or adjusted under 35 U.S.C. 154(b) by 0 days.

(21) Appl. No.: 15/741,605

(22) PCT Filed: Jun. 28, 2016

(86) PCT No.: PCT/EP2016/064928
§ 371 (c)(1),
(2) Date: Jan. 3, 2018

(87) PCT Pub. No.: WO2017/025238
PCT Pub. Date: Feb. 16, 2017

(65) Prior Publication Data
US 2018/0184839 A1    Jul. 5, 2018

(30) Foreign Application Priority Data

Aug. 7, 2015   (DE) .................... 20 2015 104 155 U

(51) Int. Cl.
*B08B 3/08*     (2006.01)
*A47J 31/60*    (2006.01)
*B08B 9/032*    (2006.01)

(52) U.S. Cl.
CPC ................ *A47J 31/60* (2013.01); *B08B 3/08* (2013.01); *B08B 9/032* (2013.01); *B08B 2203/027* (2013.01)

(58) Field of Classification Search
CPC ...... A47J 31/60; B08B 2203/027; B08B 3/08; B08B 9/032
USPC .................................................. 222/81, 465.1
See application file for complete search history.

(56) References Cited

U.S. PATENT DOCUMENTS

| | | | | |
|---|---|---|---|---|
| 2,233,996 A | * | 3/1941 | Dent ..................... | G01F 11/262 222/456 |
| 3,831,814 A | * | 8/1974 | Butler ................... | A61M 5/162 222/81 |
| 3,979,221 A | * | 9/1976 | Roberts .................. | A47J 31/44 134/99.1 |
| 4,015,618 A | * | 4/1977 | Schmid .................. | A01J 7/022 134/58 R |

(Continued)

FOREIGN PATENT DOCUMENTS

| | | |
|---|---|---|
| DE | 102008003733 | 7/2009 |
| DE | 102009030416 | 12/2010 |

(Continued)

*Primary Examiner* — Patrick M. Buechner
*Assistant Examiner* — Michael J. Melaragno
(74) *Attorney, Agent, or Firm* — Volpe and Koenig, P.C.

(57) ABSTRACT

In order to provide simple and safe handling of cleaning agents in a drink dispensing device with an integrated cleaning system, a cleaning agent container is disclosed which is designed as a container (1) that is closed on all sides and comprises a connection terminal (4) arranged laterally on the container. This connection terminal (4) includes a first piercing region (7a) that is provided with a pierceable closure (13, 8a) and fluidically communicates with the base region of the container (1).

13 Claims, 3 Drawing Sheets

(56) References Cited

U.S. PATENT DOCUMENTS

| | | | | |
|---|---|---|---|---|
| 4,599,173 | A * | 7/1986 | Berger | B08B 3/08 134/166 R |
| 4,784,299 | A * | 11/1988 | Stenger | B67D 1/0829 222/397 |
| 4,923,098 | A * | 5/1990 | Schoonover | B65D 1/18 215/380 |
| 5,025,955 | A * | 6/1991 | Stenger | B67B 7/26 222/400.8 |
| 5,439,144 | A * | 8/1995 | Holzner | A47K 5/1209 222/189.06 |
| 6,123,122 | A * | 9/2000 | Dushman | B67D 3/0032 141/330 |
| 6,126,045 | A * | 10/2000 | Last | B65D 41/02 222/501 |
| 6,138,691 | A * | 10/2000 | Voloshin | B08B 9/00 134/21 |
| 6,138,693 | A * | 10/2000 | Matz | A47L 15/4418 134/100.1 |
| 7,114,531 | B2 * | 10/2006 | Silva | B01J 4/02 141/3 |
| 7,513,394 | B2 * | 4/2009 | Bone | B65D 25/44 222/465.1 |
| 7,607,555 | B2 * | 10/2009 | Smith | B65D 77/067 215/257 |
| 8,931,667 | B2 * | 1/2015 | Smith | D06F 39/022 222/325 |
| D794,463 | S * | 8/2017 | Turi | D9/528 |
| 9,976,752 | B2 * | 5/2018 | Topfer | B08B 9/0936 |
| 2006/0027281 | A1 * | 2/2006 | Silva | B01J 4/02 141/63 |
| 2006/0080860 | A1 * | 4/2006 | Clark | D06F 43/00 34/597 |
| 2006/0272359 | A1 * | 12/2006 | Kang | D06F 39/02 68/17 R |
| 2009/0183754 | A1 | 7/2009 | Vetterli et al. | |
| 2010/0071777 | A1 * | 3/2010 | Smith | D06F 39/022 137/14 |
| 2013/0146094 | A1 * | 6/2013 | Riefenstein | B08B 3/04 134/22.1 |
| 2013/0175292 | A1 * | 7/2013 | Burgess | D06F 39/022 222/23 |
| 2014/0103065 | A1 * | 4/2014 | Lambrecht | B67D 1/0004 222/81 |
| 2015/0090735 | A1 * | 4/2015 | Smith | D06F 39/022 222/83 |
| 2016/0022088 | A1 * | 1/2016 | Dick | A47J 31/60 134/10 |
| 2017/0208990 | A1 | 7/2017 | Turi et al. | |
| 2018/0001355 | A1 * | 1/2018 | Shibata | C23G 1/24 |
| 2018/0192818 | A1 * | 7/2018 | Epping | A47J 31/46 |
| 2018/0255964 | A1 * | 9/2018 | Vetterli | A47J 31/60 |

FOREIGN PATENT DOCUMENTS

| | | |
|---|---|---|
| DE | 102011081010 | 2/2013 |
| DE | 102014215689 | 2/2016 |
| EP | 2020197 | 2/2009 |
| EP | 2695555 | 2/2014 |
| EP | 2705784 | 3/2014 |
| WO | 2015059213 | 4/2015 |

* cited by examiner

CLEANING AGENT CONTAINER

BACKGROUND

The present invention relates to a cleaning agent container for an integrated cleaning system of a device for dispensing liquid food items, particularly milk products.

When dispensing liquid food items, for example in the form of hot or cold beverages, frequently processing of the liquid food item occurs in the dispensing device, for example by way of heating, cooling, mixing of different food ingredients, frothing, or the like. The components inside the beverage dispensing device, which come into contact with the liquid food item, must here be cleaned in regular intervals for hygienic reasons. This occurs generally by a cleaning system, which rinses the respective components and pipelines with a rinsing solution. Depending on the type of food item, here specific cleaning agents must be used, by which residue of food items can be removed.

For practical reasons, the cleaning agent is frequently provided in a concentrated form, from which inside the rinsing system the rinsing solution is produced upon being mixed with water. For this purpose, the cleaning system may particularly comprise a cleaning agent pump, which is provided to convey the cleaning agent from a cleaning agent container into a mixing chamber, in which the cleaning solution is then mixed.

A cleaning module for machines for the production of liquid food items, particularly for coffee makers, is described in DE 10 2008 903 733. The cleaning module comprises at least one cleaning agent container, a dosing pump for conveying the cleaning agent, and a mixing container for mixing a rinsing solution comprising water supplied thereto and cleaning agent. In order to execute a cleaning process the cleaning module is connected to the coffee maker, instead of the food reservoir.

From DE 10 2014 215 689, not published earlier, a beverage dispensing device is known with a cleaning system, in which a cleaning agent container and a corresponding cleaning agent pump are provided, integrated in the beverage dispensing device. When a food container is replaced by a cleaning agent—mixing container the beverage dispensing device detects this fact automatically and a cleaning process can be started.

In such a beverage dispensing device with an integrated cleaning system the simple and secure handling of the cleaning agent is of particular importance. On the one hand, the filling or replacement of the cleaning agent must be possible in a simple and quick fashion, even by an untrained operator, and on the other hand it must be ensured that the interior of the beverage dispensing device is not soiled by spilled cleaning agent. In particular it must be excluded that any cleaning agent can come into contact with the liquid food item.

SUMMARY

The invention therefore serves the purpose to provide a cleaning agent container, which allows a simple and safe handling.

This objective is attained with a cleaning agent container and system using one or more features of the invention. Advantageous embodiments are discernible from the description and claims that follow.

According to the invention a cleaning agent container is provided for an integrated cleaning system of a device for dispensing liquid food items, particularly milk products, embodied as a container closed at all sides and comprising a connection terminal arranged laterally on the container. The connection terminal comprises a first piercing region, provided with a pierceable closure, which communicates fluidically with the base region of the container.

Due to the fact that the cleaning agent container is closed at all sides, when inserting it into the beverage dispensing device no cleaning agent can leak or be spilled. An access to the cleaning agent inside the cleaning agent container is provided according to the invention such that the closure of the cleaning agent container is pierced. The piercing occurs preferably during or after the insertion process of the cleaning agent container into the beverage dispensing device. Through the piercing channel and/or the mandrel by which the closure is pierced the cleaning agent can be conveyed by a cleaning agent pump out of the cleaning agent container in order to mix therefrom a rinsing solution and perform a cleaning process with it.

Preferably, the connection terminal is arranged in an upper region of the cleaning agent container and the first piercing region ends in a discharge line leading to the base of the cleaning agent container. This way it is ensured that the cleaning agent is suctioned, on the one hand, from the base area of the container such that said container can be drained completely, and that on the other hand any cleaning agent remaining in the container during the draining of the cleaning agent container cannot leak or drip through the piercing channel.

The discharge line may be connected preferably in one piece with the cleaning agent container. For example, the discharge line may be guided at the exterior of the container or also inside the container to its base region and here end in the interior of the cleaning agent container.

Additionally, it may be provided in the cleaning agent container that the connection terminal includes a second piercing region, also provided with a pierceable closure, which ends in the upper region of the cleaning agent container. This second piercing region can also be pierced by a mandrel during or after the insertion process of the cleaning agent container into the beverage dispensing device in order to allow air to be supplied to the cleaning agent container. This way, during the removal of cleaning agent air can flow into the cleaning agent container filling the tapped volume so that no vacuum develops inside the cleaning agent container.

In a preferred embodiment the cleaning agent container is embodied approximately box-shaped and exhibits two long and two narrow side walls. The connection terminal is here arranged at one of the narrow side walls. This way, the cleaning agent container can be placed inside the beverage dispensing device in a space-saving fashion. In particular, the cleaning agent container may be embodied as an insertion cartridge, which can be inserted laterally into a receiving area embodied as an insertion slot, namely preferably with the connection terminal leading.

The pierceable closure of the first and/or second piercing regions may be formed for example as an elastic closure plug or an elastic diaphragm, for example made from silicon or rubber. Such an elastic closure plug and/or diaphragm is advantageous in that the piercing channel, upon the piercing mandrel being pulled out, more or less tightly closes due to the elastic material features so that no cleaning agent can leak during the removal of the cleaning agent container.

Alternatively the pierceable closure of the first and/or second piercing region may be embodied with a closing film, connected at the edges to the cleaning agent container, for example welded thereto.

Such a closing film may also be used additionally upstream of a closing plug. In this case, before inserting the cleaning agent container it is not necessary to remove it, but it can be pierced together with the closing plug. The closing film serves here also as a sealing film, by which it can be detected if the cleaning agent has already been used and the closing plug therefore has already been pierced.

If a diaphragm or film is used as the pierceable closure, an additional closure lip may be arranged behind the piercing region, which upon piercing the closure is held via a hollow mandrel, and after the removal of said mandrel closes from the inside the piercing channel generated thereby. Such a closure lip serves therefore as an additional leak protection when removing the cleaning agent container.

It is further advantageous when the rear section of the cleaning agent container, distant from the connection terminal, is embodied as a handle, including a recessed grip. In the inserted state, the cleaning agent container can then be engaged at its recessed grip and easily pulled out.

The cleaning agent container is preferably embodied as a disposable container and is filled with a cleaning agent, sealed in an air-tight fashion, and delivered with an intact sealing film. This way it is ensured that a suitable and/or manufacturer specified cleaning agent is used so that the cleaning of the device can occur as required. Of course, the cleaning agent container may also be embodied in a fashion allowing refilling so that it can be removed from its insertion slot, refilled, and inserted anew into the device.

Additionally, the invention also relates to a device for dispensing liquid food items, and particularly milk products, comprising an integrated cleaning system and a receiving area for inserting a cleaning agent container of the above-mentioned type. The device comprises at the inside thereof, at the side facing away from an inserting opening, a hollow mandrel for piercing the closure of the cleaning agent container at a height matching the first insertion region. A cleaning agent supply line of the integrated cleaning system is connected at the hollow mandrel, by which the closure is pierced. The mandrel therefore remains in the piercing channel of the pierced closure plug for discharging the cleaning agent, and after the piercing of the closure generates a fluid-tight connection between the cleaning agent container and the cleaning system.

Advantageously, a second hollow mandrel is arranged at a side of the receiving area, facing away from the insertion opening, at a height matching the second piercing region of the cleaning agent container, by which air can flow into the cleaning agent container. In such a beverage dispensing device therefore, in a simple fashion, a cleaning agent container can be inserted through the insertion opening into the receiving area, and during the insertion process the piercing region or regions are pierced by the piercing mandrel or mandrels and the cleaning agent container is in this way automatically connected to the cleaning agent system in order to discharge the cleaning agent.

BRIEF DESCRIPTION OF THE DRAWINGS

In the following, additional advantages and features of the present invention are explained based on the drawing using an exemplary embodiment. Shown are.

DETAILED DESCRIPTION OF THE PREFERRED EMBODIMENTS

Figure 1:
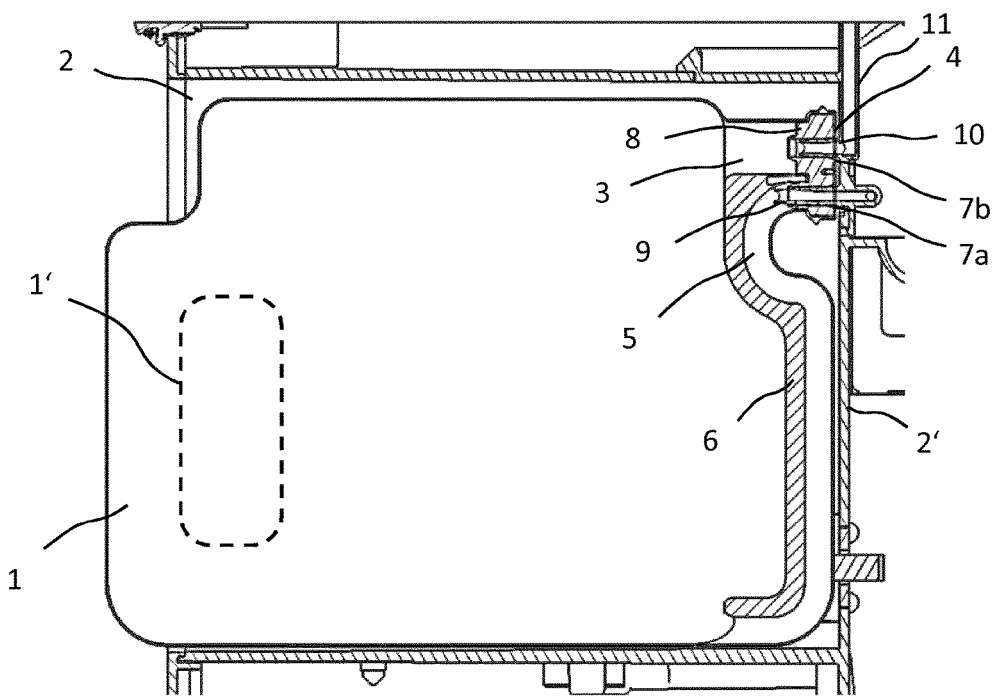
FIG. 1 a cross-section through a cleaning agent container inserted in an insertion slot of a beverage dispensing device, FIG. 2 a front view of a cleaning agent container of FIG. 1 of a side wall with a connection terminal, FIG. 3 an enlarged detail of a cross-section through the cleaning agent container, FIG. 4 a detail of the connection region with a pierceable closure plug, and FIG. 5 an isometric illustration of the cleaning agent container of FIG. 1.

FIG. 1 shows a lateral section through a cleaning agent container 1, which is inserted in an insertion slot 2 of a fully-automatic coffee maker, embodied for receiving the cleaning agent container 1. The cleaning agent container 1 is embodied approximately box-shaped, with the sectional plane A-A (see FIG. 2) extending perpendicular to a narrow side of the cleaning agent container 1. At its frontal section, inserted in the insertion slot 2, a bottle neck 3 is attached to the cleaning agent container 1, with its end forming a connection terminal 4.

A discharge line 5 extends from the lower region of the connection terminal 4 outside the cleaning agent container 1 parallel thereto to its base and ends here in the cleaning agent container 1. The discharge line 5 is connected via a material brace 6 in one piece with the cleaning agent container 1. The bottle neck 3, which connects the cleaning agent container 1 to the connection terminal 4, ends directly in the upper region of the cleaning agent container 1. The lower region of the connection terminal 4 forms a first piercing region 7a, which ends in the discharge line 5. The upper region of the connection terminal 4, ending in the bottle neck 3, forms a second piercing region 7b. The piercing regions 7a, 7b are provided with a common closure film 13, covering the entire front opening of the connection terminal 4, which film is welded at the edge or adhered to the opening of the connection terminal 4. Behind the closure film 13, as an additional leak proofing, a common silicon part 8 is provided formed with plugs 8a, 8b, projecting respectively into the openings of the bottle neck 3 and the discharge line 5, which at their respective ends show two centrally tapering closure lips 14a, 14b (see FIG. 4).

A mandrel 9 is arranged in the insertion slot 2 at the right facial side 2', facing away from the insertion opening, at the height of the first lower piercing region, which pierces the closing film 13 when the cleaning agent container 1 is inserted into the insertion slot 2. A cleaning agent supply line is connected to the hollow mandrel 9 to an integrated cleaning system of the fully-automatic coffee maker (not shown). A second hollow mandrel 10 is arranged above the hollow mandrel 9, which pierces the closing film 13 at the height of the second piercing region. The hollow mandrel 10 is connected to an air intake line 11, and ensures that air can flow into the cleaning agent container 1 during the discharge of cleaning agent.

Figure 2:
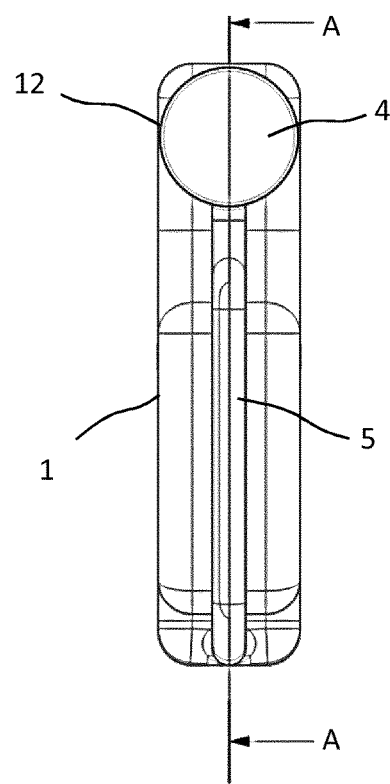

FIG. 2 shows an illustration of the facial sides of the cleaning agent container 1. The connection terminal 4 is protected in the upper area of the cleaning agent container by a closure cap 12, which is screwed thereon and which prior to inserting the cleaning agent container 1 into the insertion slot 2 of the fully-automatic coffee maker is screwed off. The section line A-A indicates the section plane of the cross-sections shown in FIG. 1 as well as FIGS. 3 and 4. The discharge line 5 extends in front of the cleaning agent container 1 from the connection terminal 4 to the lower region of the cleaning agent container 1. This discharge line ends, when seen from the side, flush with the connection terminal 4 and serves therefore simultaneously as an end stop when inserting the cleaning agent container 1 into the insertion slot 2.

The cleaning agent container 1 is embodied as a disposable unit and filled in the factory with the cleaning agent. In the exemplary embodiment the cleaning agent is a milk cleaner and serves for cleaning the milk frothing system, integrated in the fully-automatic coffee maker, from any milk residue adhering there, particularly proteins. The integrated cleaning system itself is embodied similar to the above-mentioned DE 10 2014 21 56 89, which is incorporated herein in its entirety by way of reference in order to avoid unnecessary repetitions. The cleaning system comprises, in addition to the cleaning agent container, particularly a dosing pump as well as a cleaning agent—mixing container, in which a rinsing solution is mixed from the cleaning agent and water introduced thereto. In order to execute a cleaning process the integrated milk frothing system of the fully-automatic coffee maker, particularly the milk pump, the milk lines, as well as perhaps existing tank-less water heaters and frothing chambers, are rinsed with the rinsing solution up to the dispensing outlet for milk and/or milk froth. Subsequently, a clear rinsing process occurs with clear water and/or hot steam.

The cleaning agent container 1 is made from a synthetic material, such as PET or PE-HD. The rear region of the cleaning agent container 1 is embodied as a handle, and shows at both sides a recessed grip 1', at which the cleaning agent container, inserted in the coffee maker, can be engaged and pulled out from a receiving slot.

Figure 3:
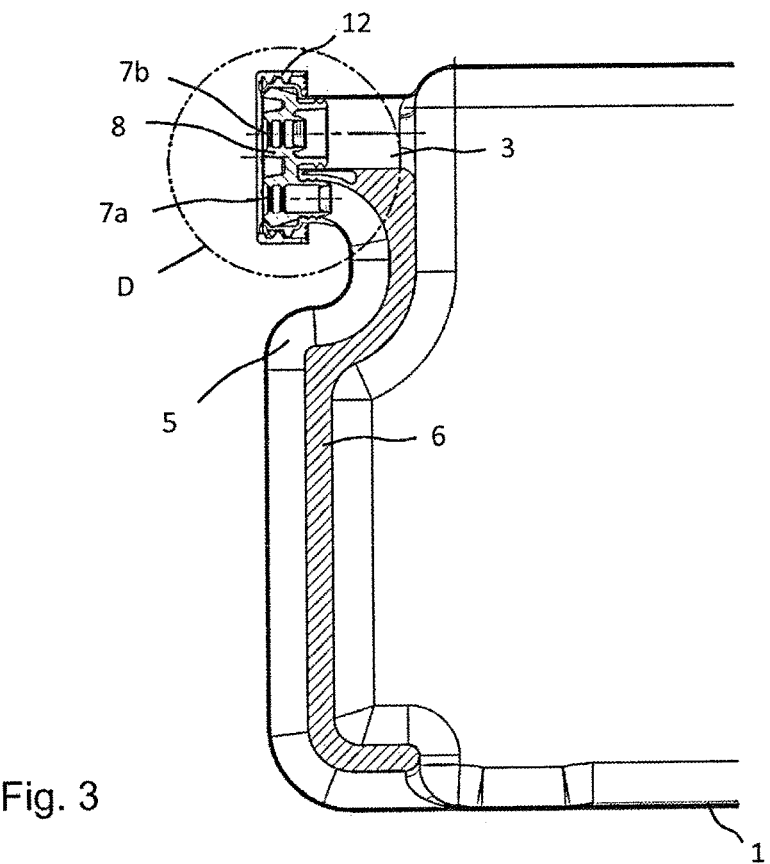
Figure 4:
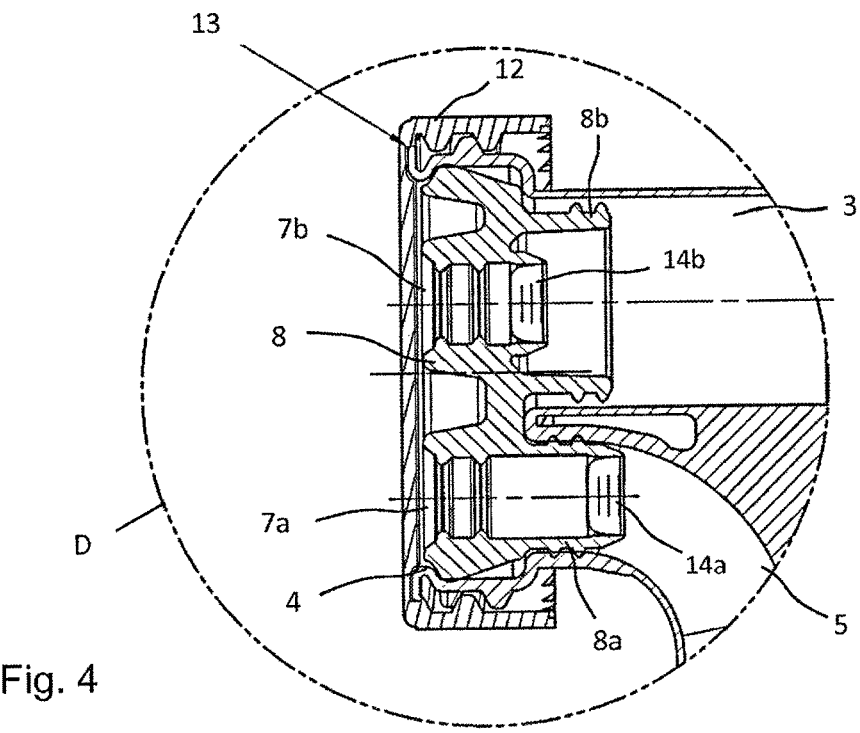

The frontal region of the cleaning agent container 1 with the connection terminal 4 is shown once more in FIG. 3. An illustrated detail of the bottle neck 3 and the connection terminal 4 is shown in FIG. 4 in an enlarged view. The lower piercing region 7a, ending in the discharge line 5, and the upper piercing region 7b, directly connected via the bottle neck to the upper region of the milk container 1, are closed by a common formed silicon part 8, which ends in a plug 8a, 8b tapering respectively both towards the discharge line 5 and the bottle neck 3. In front of the silicon part 8, as a common pierceable closure, a plastic film 13 is provided and welded to the edge of the connection terminal 4. Each of the two plugs 8a, 8b is embodied at its inner end with a pair of tapering closing lips 14a, 14b.

The two pairs of closing lips 14a, 14b seal the gap respectively remaining between them in a fluid-tight fashion. When the respective piercing region 7a, 7b is pierced by a hollow mandrel, the hollow mandrel keeps the respective closing lips 14a, 14b apart. When the mandrel is pulled out, the pairs of closing lips 14a, 14b close again the gap that had respectively developed between them, so that even after the piercing of the closing film 13 no cleaning agent can leak, if the cleaning agent container 1 was removed from the receiving slot 2.

When the cleaning agent container is inserted in the receiving slot 2 of the fully-automatic coffee maker, the synthetic film 13 is pierced by the piercing mandrels 9, 10 and the cleaning agent container is this way opened for discharging the cleaning agent. Of course, instead of a synthetic film 13 here also a different type of closing film or diaphragm may be used, for example an aluminum foil or a closure made from a laminate based on synthetics, paper, and/or metals. A synthetic cap 12 is screwed on to protect the connection terminal 4, which cap must be removed prior to inserting the cleaning agent container.

Figure 5:
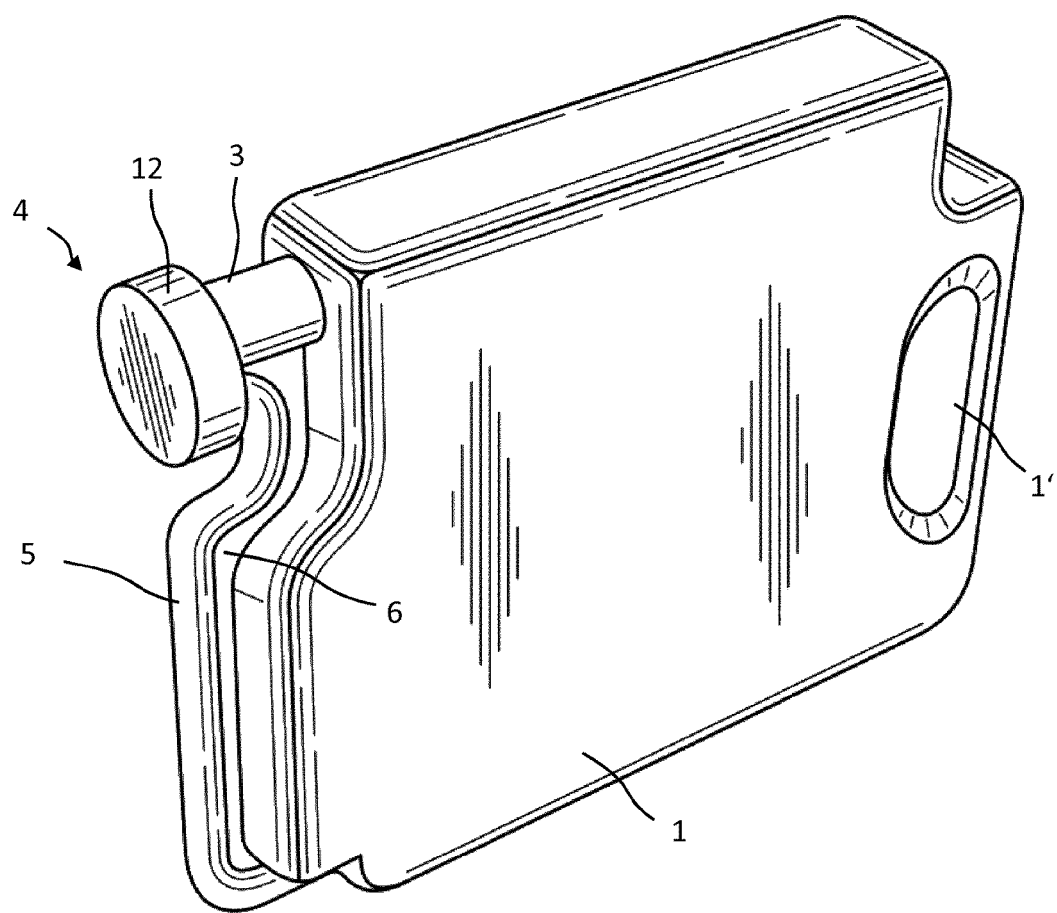

FIG. 5 shows the cleaning agent container once more in an isometric illustration.

In order to store cleaning agent for the fully-automatic coffee maker only the old, empty cleaning agent container must be removed and a new, fresh cleaning agent container inserted into the insertion slot 2. Here, the piercing mandrels 9, 10 pierce the two piercing regions 7a, 7b and generate a connection between the cleaning agent supply line of the integrated cleaning system and the discharge line 5 of the cleaning agent container as well as a connection to the air supply line 11. The integrated cleaning system is therefore immediately ready for operation upon insertion of the cleaning agent container 1. Additionally, a sensor may be provided in the insertion slot 2 of the fully-automatic coffee maker, by which it can be detected if a cleaning agent has been inserted. Based on an identification, such as a barcode or a RFID-tag, it can also be detected if the inserted cleaning agent container and/or the cleaning agent contained therein are suitable, and if this is not the case, a control unit of the fully-automatic coffee maker can issue an error message and/or any activation or execution of the cleaning process can be prevented.

In addition to the use for cleaning the integrated milk system of a fully-automatic coffee maker, the cleaning agent bottle described here can also be used in a plurality of other devices for dispensing liquid food items, in which for hygienic reasons automatic cleaning processes are performed. The cleaning agent, which is filled in the factory into the cleaning agent container, may be selected based on the purpose for use and the type of food item dispensed. Additionally, it is of course also possible to refill an empty cleaning agent container and reuse it.

The invention claimed is:

1. A cleaning agent container for an integrated cleaning system of a device for dispensing liquid food items, comprising a container (1), closed at all sides, with a connection terminal (4) arranged laterally on the container, with the connection terminal (4) comprising a first piercing region (7a) provided with a pierceable closure (13, 8a), fluidically communicating with a base region of the container (1), the connection terminal (4) is arranged in an upper region of the cleaning agent container (1) and the first piercing region (7a) ends in a discharge line (5) leading to the base region of the cleaning agent container (1).

2. The cleaning agent container according to claim 1, wherein the discharge line (5) is connected in one piece with the cleaning agent container (1).

3. The cleaning agent container according to claim 1, wherein the connection terminal (4) comprises a second piercing region (7b), provided with a second pierceable closure (13, 8b), which ends in an upper region of the cleaning agent container (1).

4. The cleaning agent container according to claim 1, wherein the container is box-shaped and includes two long side walls and two narrow side walls, with the connection terminal (4) being arranged on one of the narrow side walls.

5. The cleaning agent container according to claim 1, wherein the cleaning agent container (1) is formed as an insertion cartridge.

6. The cleaning agent container according to claim 3, wherein the pierceable closure of at least one of the first piercing region or the second piercing region (7a, 7b) comprises an elastic closure plug (8).

7. The cleaning agent container according to claim 3, wherein the pierceable closure of at least one of the first piercing region or second piercing region (7a, 7b) is formed by a closure film (13) connected at edges thereof to the cleaning agent container (1).

8. The cleaning agent container according to claim 1, wherein at or behind the pierceable closure (13, 8a, 8b) at least one closure lip (14a, 14b) is arranged, which after a hollow mandrel (9) has pierced the piercing region (7a, 7b)

is adapted to be held by said mandrel and after the removal of the mandrel (9) is adapted to close a piercing channel formed thereby.

9. The cleaning agent container according to claim 1, wherein a rear section of the cleaning agent container (1), distanced from the connection terminal (4), is embodied as a handle with a recessed grip (1').

10. The cleaning agent container according to claim 1, wherein the cleaning agent container is a disposable container.

11. The cleaning agent container according to claim 1, further a cleaning agent located in the container.

12. A device for dispensing liquid food items, comprising an integrated cleaning system and a receiving area (2) that receives the cleaning agent container (1) according to claim 1, a hollow mandrel (9) arranged in the receiving area (2) at a side (2') facing away from an insertion opening at a height equivalent to the first piercing region (7*a*) for piercing the closure (8*a*) of the cleaning agent container (1), with the hollow mandrel (9) being connected to a cleaning agent— supply line integrated in the cleaning system.

13. The device according to claim 12, further comprising at the side of the receiving area (2) facing away from the insertion opening, a second hollow mandrel (10) arranged at an appropriate height to a second piercing region (7*a*) of the cleaning agent container (1) that pierces the second piercing region, via which air is adapted to flow into the cleaning agent container (1).

* * * * *